United States Patent
Gozum et al.

(10) Patent No.: US 6,535,667 B1
(45) Date of Patent: Mar. 18, 2003

(54) LIGHT FIBER COMPRISING CONTINUOUS OUTER CLADDING AND METHOD OF MAKING

(75) Inventors: John E. Gozum, Stillwater, MN (US); Thomas J. Reid, White Bear Lake, MN (US); Gerald L. Uhl, St. Paul, MN (US); Raymond C. Wegleitner, Maplewood, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/039,602

(22) Filed: Dec. 31, 2001

(51) Int. Cl.[7] .................................................. G02B 6/42
(52) U.S. Cl. .......................... 385/31; 428/373; 156/85; 264/1.24; 385/125
(58) Field of Search .............................. 385/30–37, 129, 385/130, 131, 147, 123, 124, 125, 145; 264/1.24; 156/85, 244.11, 244.12; 428/373; 359/123

(56) References Cited

U.S. PATENT DOCUMENTS

| | | | | |
|---|---|---|---|---|
| 4,957,374 A | * | 9/1990 | Yasuda et al. | 266/99 |
| 5,052,778 A | * | 10/1991 | Jamshid | 385/123 |
| 5,067,831 A | * | 11/1991 | Robbins et al. | 385/123 |
| 5,149,467 A | * | 9/1992 | Zarian | 264/1.24 |
| 5,221,387 A | * | 6/1993 | Robbins et al. | 156/244.11 |
| 5,298,327 A | * | 3/1994 | Zarian et al. | 264/1.24 |
| 5,432,876 A | | 7/1995 | Appeldorn et al. | |
| 5,631,994 A | | 5/1997 | Appeldorn et al. | |
| 5,659,643 A | | 8/1997 | Appeldorn et al. | |
| 5,845,038 A | | 12/1998 | Lundin et al. | |
| 5,905,826 A | | 5/1999 | Benson, Jr. et al. | |
| 5,995,690 A | | 11/1999 | Kotz et al. | |
| 6,267,492 B1 | | 7/2001 | Reid et al. | |

FOREIGN PATENT DOCUMENTS

| | | |
|---|---|---|
| WO | WO 95/17303 A1 | 6/1995 |
| WO | WO 95/17691 A1 | 6/1995 |
| WO | WO 95/17692 A1 | 6/1995 |
| WO | WO 95/17699 A1 | 6/1995 |
| WO | WO 96/19347 A2 | 6/1996 |
| WO | WO 97/15846 A1 | 5/1997 |
| WO | WO 99/59804 A1 | 11/1999 |
| WO | WO 01/47696 A1 | 7/2001 |

* cited by examiner

Primary Examiner—Akm E. Ullah

(57) ABSTRACT

Light fibers comprising: (a) an elongate polymeric core having an input end for receiving light from a light source, an output end for emitting light transmitted through the core, and a lateral surface extending along a longitudinal axis of the core between the input end and the output end; (b) a light-emitting region directing light traveling though the light fiber out of at least a portion the lateral surface of the light fiber in a direction generally transverse to the longitudinal axis, the light-emitting region comprising at least one optical element; and (c) a continuous outer cladding layer comprising a polymeric material having a lower index of refraction than the core extending over the lateral surface of the core and the optical elements. Methods of making the light fibers using an embossing process are also reported.

21 Claims, 9 Drawing Sheets

LIGHT FIBER COMPRISING CONTINUOUS OUTER CLADDING AND METHOD OF MAKING

FIELD OF THE INVENTION

The present invention relates to light fibers that transport light by total internal reflection.

BACKGROUND OF THE INVENTION

It is known that optically transmissive materials such as glass or polymers may be used as light fibers to propagate light by total internal reflection. Light fibers typically comprise a core, typically of an inorganic glass or a synthetic polymer, and an optional cladding layer over the core. The cladding material preferably has a lower index of refraction that the core material and confines light energy to propagate through the core by total internal reflection.

In some instances it is desirable to provide a light-emitting region along at least a portion of the side or lateral surface of a light fiber. In order to provide such a light-emitting region, it is known to place a series of cuts at an angle to a plane normal to the longitudinal axis of the light fiber along the length of the light fiber. The cuts form a series of reflecting surfaces which act to reflect at least a portion of the light transmitted through the fiber out of the lateral or side surface of the fiber. If the light fiber has an outer cladding material the cuts extend through the cladding and into the core of the light fiber. Clad polymeric light fibers having notches cut along their length are commercially available under the trade designation "POLY BRIGHT" from Poly Optics Australia Pty. Ltd.

Light fibers may be used in the design of illumination devices for hard-to-reach areas in-and-around internal combustion engines and/or during automobile body repair. Typically, these devices include a light source (e.g., a flashlight or an AC light source) and a length of light fiber in communication with the light source such that light emitted from the light source impinges upon one end of the light fiber and is transmitted through the fiber. It is often desirable for the illumination device to emit both endlight (i.e., light emitted from the end of the light fiber) and sidelight (i.e., light emitted from the lateral surface of the light fiber). Since the illumination devices of the type described are used in demanding environments where they are repeatedly bent and/or twisted in order to reach a remote area for viewing, and may be soiled by oil or grease, a rugged light fiber that is capable of being repeatedly bent and/or twisted and one that is capable of being easily cleaned is desired.

SUMMARY OF THE INVENTION

The present invention provides improved clad light fibers having a light emitting region and a continuous outer cladding layer covering the lateral (i.e., sidewall) surface of the light fiber and the light-emitting region. The improved clad light fibers have increased durability and may be more easily cleaned than prior art light fibers of the type having a series of cuts or embossed notches that extend through the outer cladding. The present invention also provides a method of making the clad light fibers of the present invention and illumination devices comprising the clad light fibers of the present invention.

In one embodiment, the present invention provides a light fiber comprising:

(a) an elongate polymer core having an input end for receiving light from a light source, an output end for emitting light transmitted through the core, and a lateral surface (i.e., a sidewall) extending along the longitudinal axis of the core;

(b) a light-emitting region comprising at least one optical element that directs light traveling though the core out of at least a portion the lateral surface of the light fiber in a direction generally transverse to the longitudinal axis; and (c) an outer cladding layer which extends continuously over the lateral surface of the core and the light-emitting region said cladding layer comprising a polymeric material having an index of refraction that is less than the index of refraction of the core.

In one embodiment of the light fiber, the light-emitting region comprises a series of two or more optical elements separated at a distance from one another along the longitudinal axis of the core.

Preferably, the core of the light fiber comprises a poly (alkyl acrylates) or poly(alkyl methacrylates) and the outer cladding comprises fluorinated ethylene-propylene. Optionally, the light fibers may have a jacket layer over the outer cladding layer to provide additional protection to the light fiber.

The light-emitting region may comprise optical elements regularly spaced along the longitudinal axis of the core or optical elements that are irregularly (i.e., unequally) spaced along the longitudinal axis of the core. The depth of the optical elements typically ranges from about 1% to about 10% of a thickness of the light fiber.

In another embodiment the present invention provides a method of making a light fiber having a light-emitting region comprising the steps of:

(a) providing a clad light fiber comprising an elongate polymeric core having an input end for receiving light from a light source, an output end for emitting light transmitted through the core, and a lateral surface (i.e., a sidewall) extending along the longitudinal axis of the core;

(b) providing an embossing tool having at least one embossing element; and (c) embossing the light fiber by bringing into contact the embossing element of the embossing tool with the cladding layer of the light fiber and apply pressure such that the embossing element indents the core of the light fiber thereby forming an optical element;

wherein the cladding layer is not cut during the embossing step (i.e, step c) such that the cladding extends continuously over the lateral surface of the core and the light-emitting region.

In one embodiment of the method, a rotary embossing apparatus comprising an embossing wheel having a series of embossing elements spaced over the circumference of the wheel is employed. Embossing of the clad light fiber is achieved by rotating the wheel about its central axis while the embossing elements of the wheel are in contact with the lateral surface of the light fiber.

In another embodiment of the method, at least one embossing elements comprises a first side surface and a second side surface which meet to define a vertex having an angle ranging from about 20° to about 150°. Preferably, the vertex of the embossing element is truncated or radiused to prevent the embossing element from cutting the cladding of the light fiber.

In yet another embodiment the present invention provides an illumination device comprising:

(a) a light source;
(b) a light fiber comprising:
an elongate polymeric core having an input end for receiving light from a light source, an output end for emitting light transmitted through the core, and a lateral surface extending along a longitudinal axis of the core between the input end and the output end;
a light-emitting region directing light traveling though the light fiber out of at least a portion the lateral surface of the light fiber in a direction generally transverse to the longitudinal axis, the light-emitting region comprising at least one optical element; and
a continuous outer cladding layer comprising a polymeric material having a lower index of refraction than the core extending over the lateral surface of the core and the optical elements;
wherein the light fiber is optically coupled to the light source such that at least a portion of the light emitted from the light source impinges on the input end of the light fiber.

The light fiber may be rotatably or non-rotatably connected to the light source. It may be preferable in some embodiments for the light fiber to be detachably connected to the light source. In this way, the light source may be used with other light fibers having, for example, a different lateral angular distribution of light. In one preferred embodiment the light source is a standard flashlight.

GLOSSARY

The term "light-emitting region" refers to portions of a light fiber from which light propagating through the light fiber is emitted. The light-emitting region may extend along the entire length of the light fiber or it may extend along only a portion of the length of the light fiber. The light-emitting region may emit light with a lateral angular distribution of 360 degrees or less.

The term "optical element" is used herein to encompass any controlled indentation formed in the core of the light fiber by an embossing process, which defines one or more reflecting surfaces capable of reflecting at least a portion of light impinging thereon through the wall of the fiber. Such optical elements are to be distinguished from scratches and other imperfections and other surface irregularities, which may occur from time to time in light fibers. By appropriate control of the size and shape of each optical element as well as the pattern and spacing of the elements along the fiber, light can be selectively emitted through the light-emitting region of the sidewall of the fiber.

The term "illumination device" refers to devices that provide light with the desired wavelength(s), intensities, and distribution properties. Illumination devices may be portable or stationary.

The term "worklight" refers to an illumination device designed to illuminate areas during the performance of a task or tasks by a person, animal or machine (e.g., inspection via cameras or other sensors). A worklight may be portable or stationary.

The term "lateral angular distribution" refers to the angle over which light is emitted from the light fiber as measured in a plane that is generally perpendicular to the longitudinal axis of the light fiber.

The term "light fiber" refers to an article that receives light at an input end and propagates light to an output end and/or a light-emitting region without significant losses. In general, light fibers operate on the principle of total internal reflection, whereby light traveling through the light fiber is reflected at the surfaces of the light fiber based on differences in the indices of refraction of the material of the light fiber and the material immediately surrounding the light fiber, for example, air, cladding, etc.

The term "clad fiber" is used to describe a fiber which consists of a core having a coating of a cladding material having a lower refractive index than the core material.

These and other features and advantages of the present invention will be described more completely below with respect to various illustrative embodiments of the invention.

BRIEF DESCRIPTION OF THE DRAWINGS

FIG. 3a–1 illustrates a cross-sectional view of the light fiber shown in FIG. 3a.

FIG. 9b is a perspective view of a portion of the illumination device of FIG. 9a.

DETAILED DESCRIPTION OF ILLUSTRATIVE EMBODIMENTS OF THE INVENTION

The present invention provides polymeric light fibers that selectively emit light, which find particular utility in the construction of illumination devices.

Figure 1:
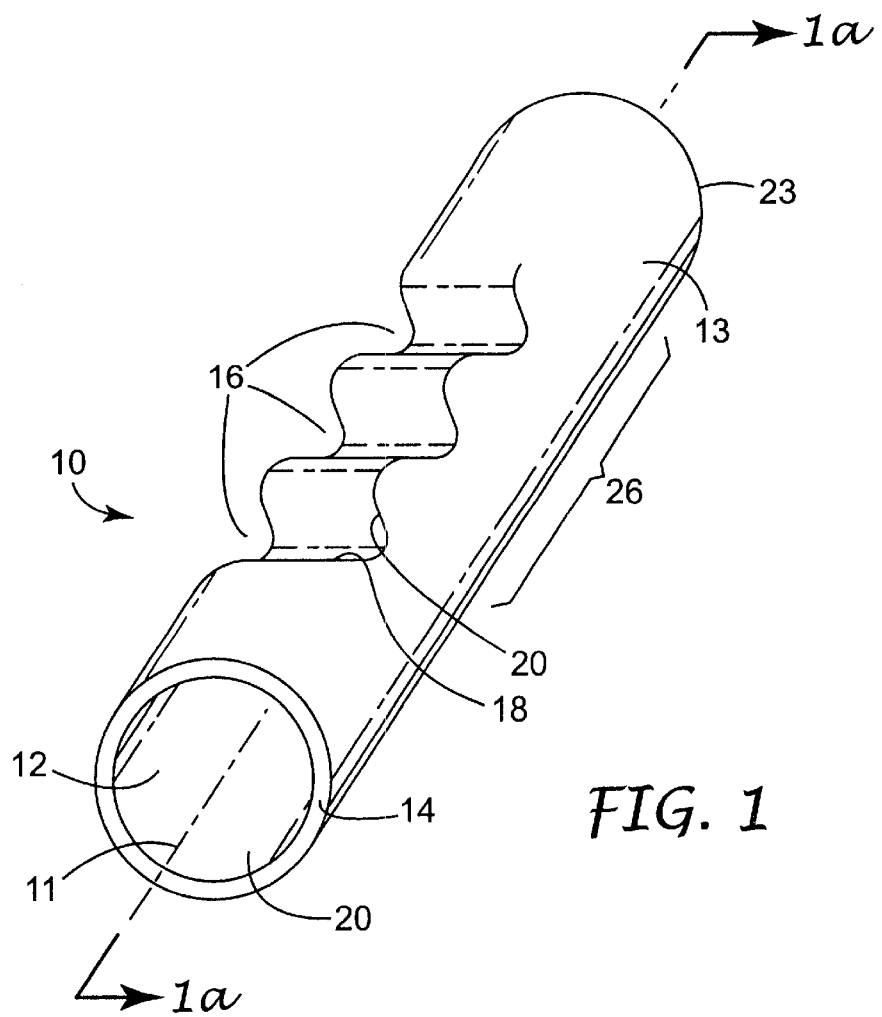
FIG. 1 is a perspective view of a clad light fiber according to the present invention.
Figure 1A:
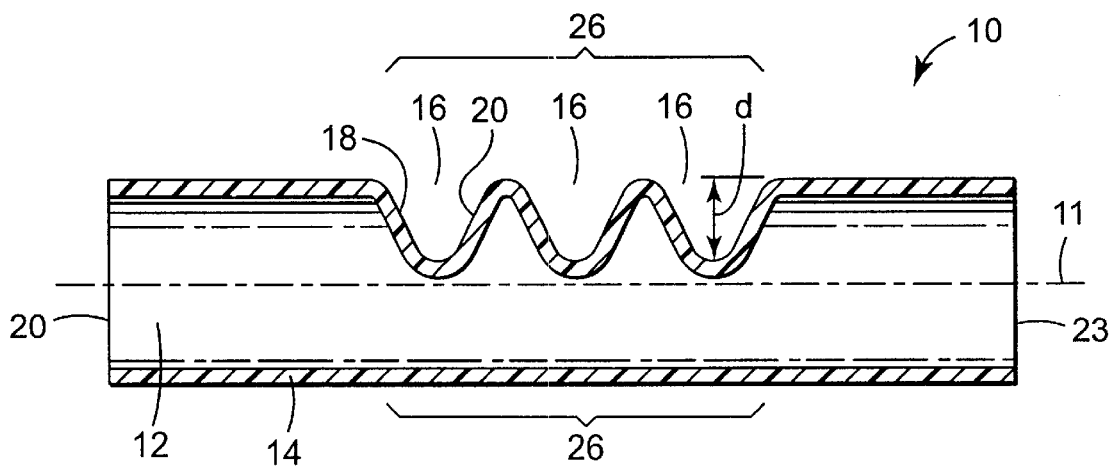
FIG. 1a is a cross-sectional view of the light fiber of FIG. 1 taken along line 1a—1a in FIG. 1.

FIG. 1 shows a perspective view of a length of light fiber 10 of the present invention. FIG. 1a is a longitudinal cross-sectional view of light fiber 10 taken along line 1a—1a in FIG. 1. Light fiber 10 has an elongate shape defining a longitudinal axis 11 and has a circular cross-sectional profile defining lateral surface 13. Light fiber 10 comprises an elongate central core 12 surrounded by an outer cladding layer 14. Outer cladding layer 14 comprises a polymer having an index of refraction that is less than the index of refraction of central core 12. Light fiber 10 further includes input end 20 for receiving light from a light source and output end 23 for emitting light (i.e., end light) that is transmitted through the length of the light fiber 10. Light fiber 10 includes light-emitting region 26 where light is emitted from the light fiber in a direction generally transverse to the longitudinal axis 11 of the light fiber 10. The light-emitting region 26 of the light fiber 10 comprises at least one optical element 16. Typically, the light-emitting region is made up of a series of optical elements spaced over at least a portion or the entire length of the light fiber 10. In the embodiment of FIG. 1, the optical elements 16 are in the form of a series of embossed indentations spaced at a regular distance from one another along the length of the light fiber 10. Optionally, the optical elements 16 may be irregularly spaced. Each optical element 16 extends into the central core 12 thereby forming a first reflecting surface 18 and second reflecting surface 20. The depth of the optical element 16 as measured from the outer surface of the light fiber 10 to the lowest point in the optical element 16 is labeled as "d" in FIG. 1a. Typically, the depth "d" will vary with the thickness of the light fiber. For example, depth "d" typically ranges from about 0.5% to about 30% of the overall thickness (e.g., diameter) of the fiber, more preferably ranging from about 1% to 10% of the thickness of the light fiber. First reflecting surface 18 and second reflecting surface 20 are typically inclined at an angle relative to a plane normal to the longitudinal axis 11 of the light fiber 10. As shown in FIG. 1a, outer cladding layer 14 extends in continuous fashion over the lateral surface of the core 12 of light fiber 10 including over the optical elements 16. That is, outer cladding layer 14 is not cut or severed by formation of the optical elements 16 in the light fiber 10.

In operation of the light fiber 10, the first reflecting surface 18 reflects at least a portion of the light that is transmitted longitudinally through the fiber through the light-emitting region 26 of the lateral surface 13 of the light fiber 10. Although light fibers of the present invention may have any desired lateral angular distribution, it is typically observed that the intensity of the light that is emitted from the light-emitting region 26 is greatest at about 180° from the optical elements 16.

Figure 2A:
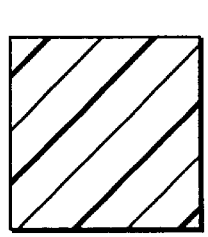
FIGS. 2a–2c illustrate various cross-sectional profiles of clad light fibers of the present invention.
Figure 2B:
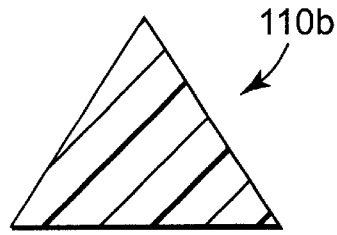
Figure 2C:
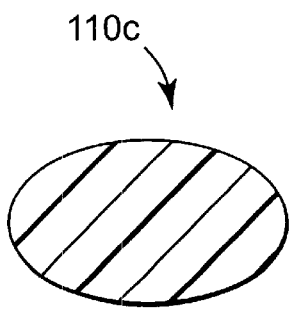

Light fiber 10 can have any useful cross-sectional profile. FIGS. 2a–2c illustrate a variety of different cross sectional profiles for light fibers that may be useful in connection with the present invention. For example, light fibers 110a in FIG. 2a has a generally square cross-sectional shape, while light fiber 110b in FIG. 2b has a triangular cross sectional shape, and light fiber 110c in FIG. 2c has a generally elliptical cross-sectional shape. The various cross-sectional shapes for light fiber is illustrated in FIGS. 2a–2c are mean to be exemplary only and are not meant to limit the present invention in any way. Those of skill in the art will understand that the light fibers of the present invention can have cross-sectional shapes of any suitable shape (i.e., circular, square, rectangular, triangular, elliptical, polygonal, combinations of one or more of the above and the like. In order to ensure an even distribution of light throughout the fiber, its it generally preferred that the cross-sectional shape should be substantially uniform over at least the light-emitting region of the fiber.

The dimensions of light fibers of the present invention will vary with the intended use of the light fiber. For many illumination devices, the diameter of the light fiber will range from about 1 mm to about 25 mm, more preferably ranging from about 5 mm to about 14 mm, and most preferably ranging from about 7 mm to about 12 mm. The length of the light fiber will vary with the intended application and can range from less than 1 cm to greater than 100 m, in some instances.

Outer cladding layer 14 comprises a polymeric material having a lower index of refraction than the material making up the core of the light fiber. Because of its lower index of refraction, the cladding layer acts to reduce stray emission of light from the side wall of the light fiber relative to an unclad light fiber comprising the same core material. Suitable materials for cladding layer 14 are known in the art and include, for example, fluorinated ethylene-propylene copolymers (commercially available under the trade designation "TEFLON FEP" from DuPont Co.), polyvinylidene fluoride, perfluoroacrylate, polytetrafluoroethylene, and tetrafluoroethylene-hexafluoropropylene-vinylidene fluoride. Typically, the thickness of the cladding material is thin as compared to the diameter of the core of the light fiber, but is thick as compared to the wavelength of light that is to be transmitted through the fiber. Typically, for light fibers having a diameter less than about 25 mm, the cladding thickness will be less than about 1 mm, more preferably ranging from about 0.2 mm to about 0.4 mm. Preferably the light fibers have a relatively small profile to be inserted through small openings to provide desired illumination within, for example, an automobile door, an engine compartment, engine port, the housing of a piece of equipment and the like.

Suitable light fiber core materials include, for example, poly(alkyl acrylates) and poly(alkyl methacrylates). A preferred material for the core comprises poly(methyl methacrylate) and copolymers of methyl methacrylate with other acrylate and methacrylate monomers, for example, ethyl acrylate, 2-ethyl hexyl acrylate, and n-butyl methacrylate. In some instances, a more flexible core material may be desired in order to produce a light fiber having a high degree of flexibility. Copolymerization of methyl methacrylate with low glass transition temperature (Tg) monomers, for example, ethyl acrylate and n-butyl acrylate, may result in a more flexible core material. One preferred core formulation comprises polymerized methyl methacrylate and has a glass transition temperature of about 54° C.

Clad polymeric light fibers and methods of making clad polymeric light fibers suitable for use in the present invention are reported, for example, in PCT Publications WO 99/59804; PCT Publication WO 01/47696; and in U.S. Pat. No. 5,298,327 (Zarian et al.).

Optionally, the light fiber of the present invention may have an outer layer of a polymeric material that covers the cladding layer. This layer is commonly referred to as a jacket layer. A jacket layer provides additional layer of protection to protect the light fiber from damage. Suitable polymeric materials for a jacket layer include, for example, polyvinyl chloride and the like.

The reflecting surface of each optical element in the light-emitting region is ordinarily inclined at an angle to a plane normal to the longitudinal axis of the fiber. Generally, the reflecting surface is inclined at an angle of from 10° to 80°, preferably 20° to 70°, and more preferably 30° to 60° relative to the plane normal to the longitudinal axis of the fiber, although any useful angle between 0° and less than 90° may be used. The reflecting surface of each optical element may be curved or substantially planar.

The reflecting surface of the optical element is preferably fabricated so as to be of optical quality. "Optical quality" is commonly understood to imply that the reflecting surface diffusely scatters only a small amount (generally less than 20%, preferably less than 10%) of the light incident upon it, the remainder being subject to specular reflection or refraction. The reflecting surface of each optical element ordinarily extends transverse to the longitudinal axis of the fiber, although it may also be formed at any angle thereto.

The optical elements are ordinarily regularly spaced along the centerline of the fiber, although any useful pattern of optical elements that is appropriate for the intended use of the fiber may be adopted. In certain embodiments, it may be desirable to maintain a substantially uniform output of light along the light-emitting region of the fiber. To achieve this, the pattern and spacing of successive optical elements may be controlled so as to compensate for the light reflected out the fiber by the preceding optical elements. For example, the cross-sectional area of the reflecting surface(s) of successive optical elements may be increased (e.g., by increasing the embossed depth of the optical elements) in the direction of intended light travel. Alternatively, the spacing between successive optical elements may be decreased or the angle of the reflecting surface(s) changed, or a combination of any or all of these methods may be used.

Figure 3A:
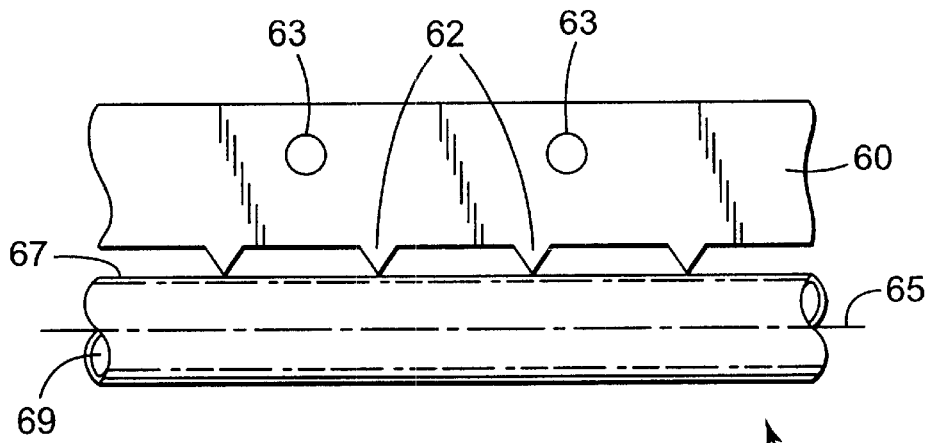
FIGS. 3a–3c illustrate an embossing apparatus useful to manufacture clad light fibers of the present invention.
Figures 1, 3A:
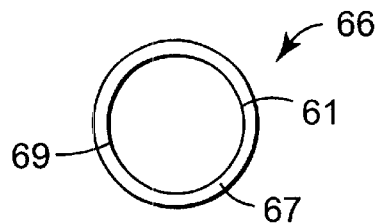
Figure 3B:
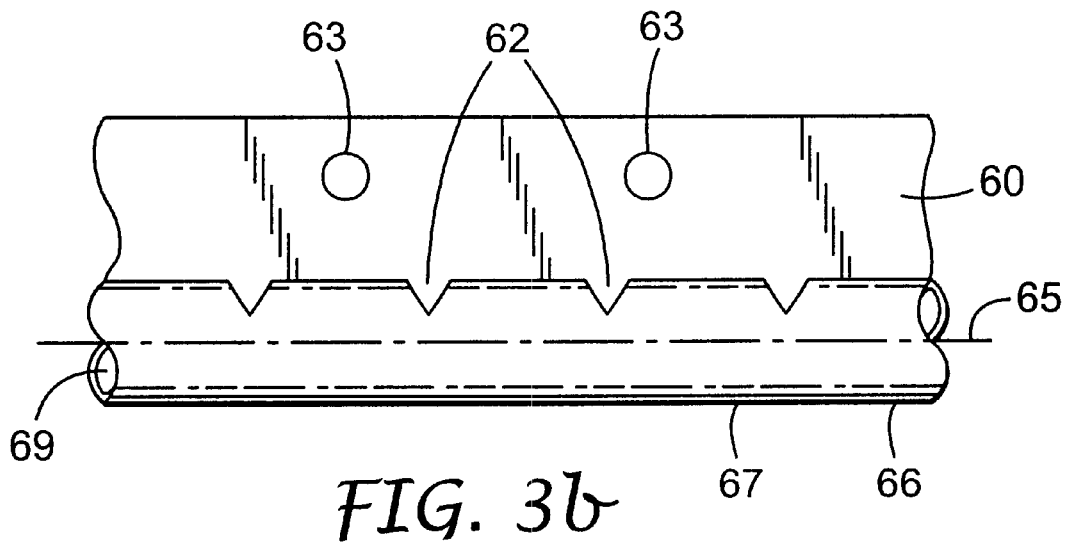
Figure 3C:
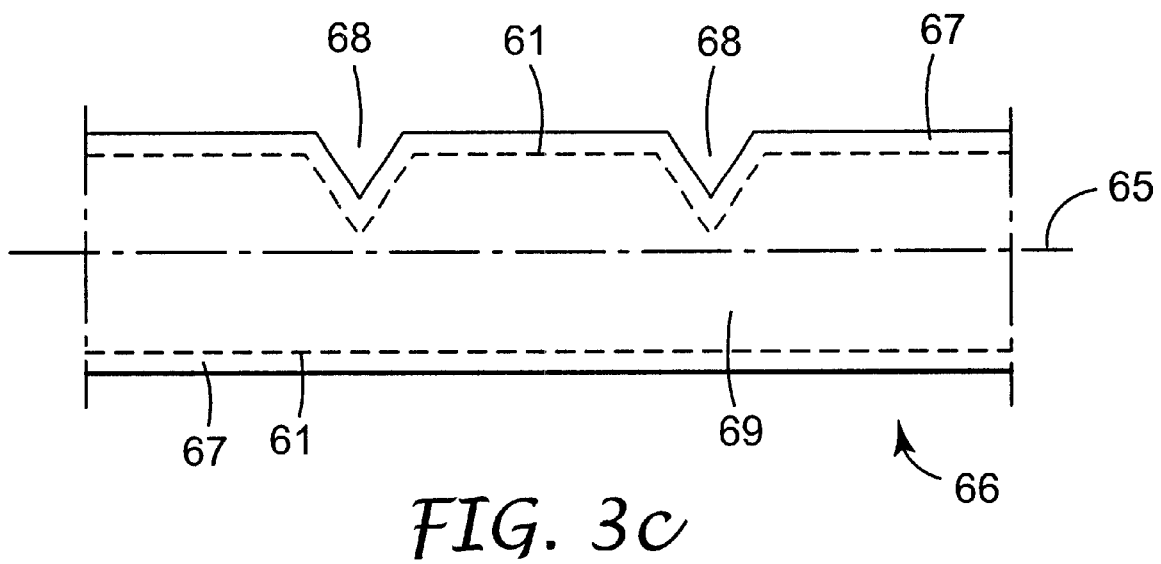

One method of manufacturing a light fiber of the present invention is a batch embossing process. Referring now to FIGS. 3a–3c, an embossing process suitable for manufacturing light fibers of the present invention is illustrated. Embossing tool 60 comprises a metal die, one surface of which has been machined to provide a series of v-shaped embossing elements 62 extending parallel to one another in a direction transverse to the longitudinal axis 65 of the light fiber 66. Embossing elements 62 are triangular or v-shaped in cross-section, although it is understood that other cross-sectional shapes may be used in accordance with the teachings of the present invention. Optionally, embossing tool 60 may be equipped with one or more heaters 63 (e.g., cartridge type electrical resistance heaters) for heating the embossing tool 60 to an elevated temperature prior to and/or during the embossing of the clad light fiber 66. Referring now to FIG. 3a–1, a cross-sectional view of light fiber 66 is shown. Light fiber 66 includes core 69 having lateral surface 61. Core 69 is surrounded by outer cladding layer 67. In use, embossing tool 60 is pressed into contact with the lateral surface of clad light fiber 66. The embossing elements 62 of the embossing tool 60 function to indent the surface of the clad light fiber 66, as shown in FIG. 3b. The embossing process is preferably conducted at an elevated temperature, for example, at a temperature ranging from about 60° F. to about 275° F. Typically, the embossing tool 60 will be held in contact with the clad light fiber 66 under pressure for a period ranging from about 5 seconds to several minutes, preferably for about 1 minute. It may be desirable in some instances to allow the embossing tool 60 to cool while the embossing tool 60 is held in contact with the light fiber 66, in order to allow the polymeric materials making up the light fiber 66 to take a set over the embossing elements. In this way, the shape of the optical elements imparted to the light fiber will more closely match the shape of the embossing elements 62 on the embossing tool 60. FIG. 3c illustrates a cross-sectional view of an embossed light fiber of the present invention taken along longitudinal axis 65. As shown in FIG. 3c, the light fiber 66 produced from the embossing operation comprises a series of optical elements 68 spaced at a distance from one another along the lateral surface of the light fiber 66. Optical elements 68 are formed without cutting outer cladding material 67 that surrounds the central core 69 of the clad light fiber 66. Accordingly, cladding layer 67 is continuous over the lateral surface of the core of the light fiber including the optical elements 68.

Figure 4:
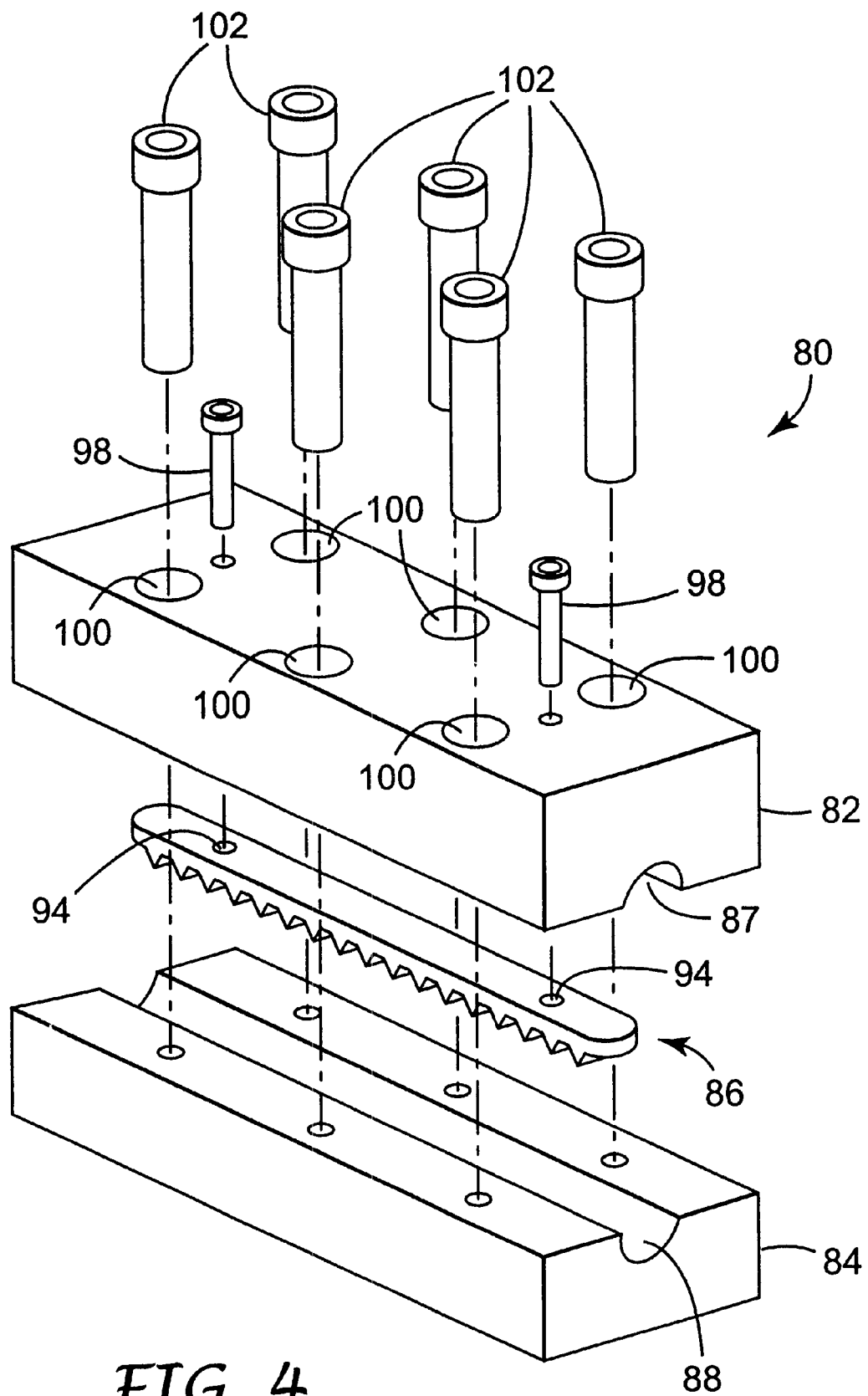
FIG. 4 illustrates an embossing apparatus useful to manufacture clad light fibers of the present invention.
Figure 4A:
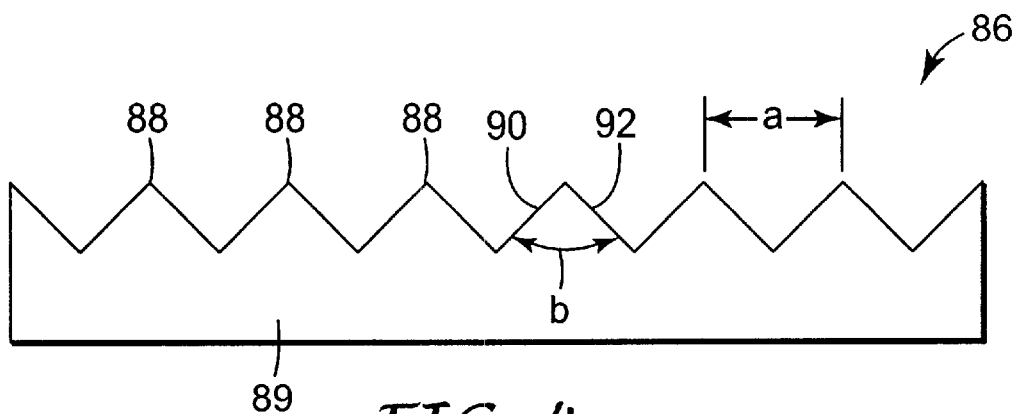
FIGS. 4a–4c illustrate various embossing elements that may be used with the embossing apparatus of FIG. 4 to manufacture clad light fibers of the present invention.
Figure 4B:
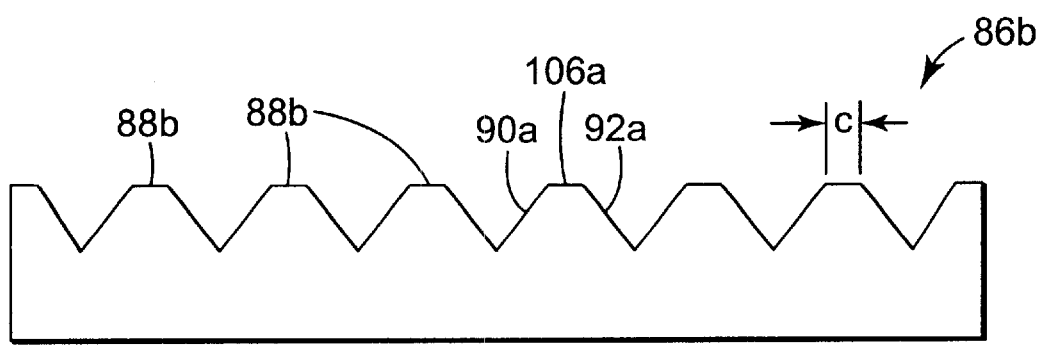
Figure 4C:
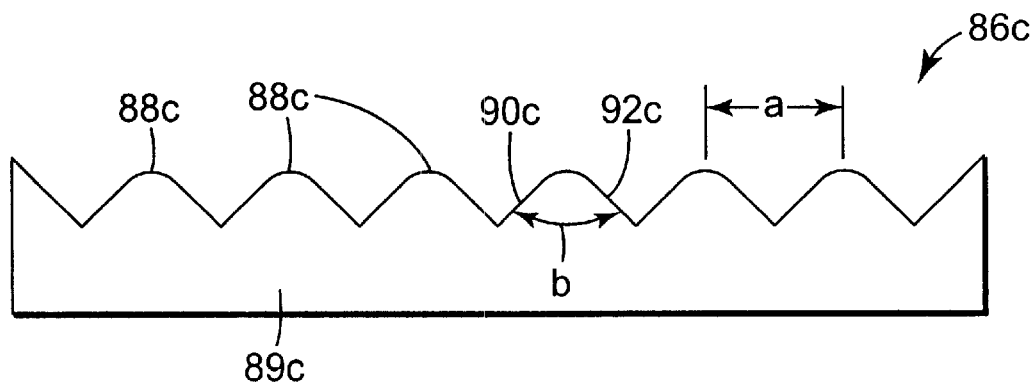

FIG. 4 shows an exploded view of an embossing tool 80 suitable for use in manufacturing light fiber of the present invention. Embossing tool 80 includes upper platen 82 and lower platen 84. Upper platen 82 includes a series of six alignment pins 102 sized to fit into a series of six alignment holes 100 to align upper platen 82 with lower platen 84 during embossing of a clad light fiber. Upper and lower platens 82 and 84 each include a channel 87 and 88, respectively, sized and shaped to hold a clad light fiber during embossing. In embossing tool 80, the channels 87 and 88 are semicircular in shape, preferably for holding a light fiber having a circular cross-sectional profile. Embossing tool 80 includes removable embossing member 86 that fits within channel 87 of upper platen 82. Embossing member 86 includes two threaded holes 94 for receiving adjusting screws 98. FIG. 4a illustrates a side view of one embodiment of an embossing member 86. Embossing member 86 includes a series of embossing elements 88 in the form of raised ridges extending from back plate 89 and spaced at a distance "a" from one another along the back plate 89. Embossing elements 88 each include two planar side surfaces 90 and 92 that meet to define a vertex angle "b" at the vertex of the raised ridge 88. Although the side surfaces of the raised ridges are generally planar, one or both of the side surfaces may be curved. Vertex angle b typically ranges from about 20° to about 150°, more preferably ranging from about 45° to about 90°. A particularly preferred vertex angle b is about 60°. FIG. 4b illustrates yet another embodiment of an embossing member 86b suitable for use in manufacturing light fiber of the present invention. In FIG. 4b the top of the embossing elements 88 in FIG. 4a has been truncated to create planar top surface 106a having face width "c". In a preferred embodiment, the face width c of truncated top surface 106a varies from about 0.1 mm to about 3 mm, more preferably ranging from about 0.2 mm to about 2 mm. Still another embodiment of an embossing member 86c is shown in FIG. 4c. In FIG. 4c the vertex of the embossing elements 88 of FIG. 4a has been rounded, for example using sandpaper, thereby creating a radiused vertex. Truncation or rounding of the vertex of the embossing elements (see, FIGS. 4b–4c) is preferred in order to prevent the embossing elements from cutting through or otherwise penetrating the outer cladding material on the light fiber during the embossing process.

Referring again to FIG. 4, when in use, embossing member 86 is mounted in channel 88 of upper platen 82 and is adjusted into the desired position using adjusting screws 98. For example, the embossing member 86 may be mounted parallel to channel 88 or the embossing member 86 may be mounted at an angle to channel 88. It may be desirable to mount embossing member 86 at an angle with respect to channel 88 in order to vary the depth the optical elements over the length of the light fiber. A clad light fiber (not shown) is placed in channel 88 of lower platen 84. Upper platen 82 is placed over lower platen 84 and they are brought together with the aid of alignment pins 102. Embossing pressure is then applied to the embossing member 86 by applying pressure to the surfaces of upper platen 82 and lower platen 84, for example, using a hydraulic press or a C-clamp. In another embodiment, the alignment pins 102 are replaced with a series of screws and embossing pressure is applied to the clad light fiber by tightening the screws.

Figure 5A:
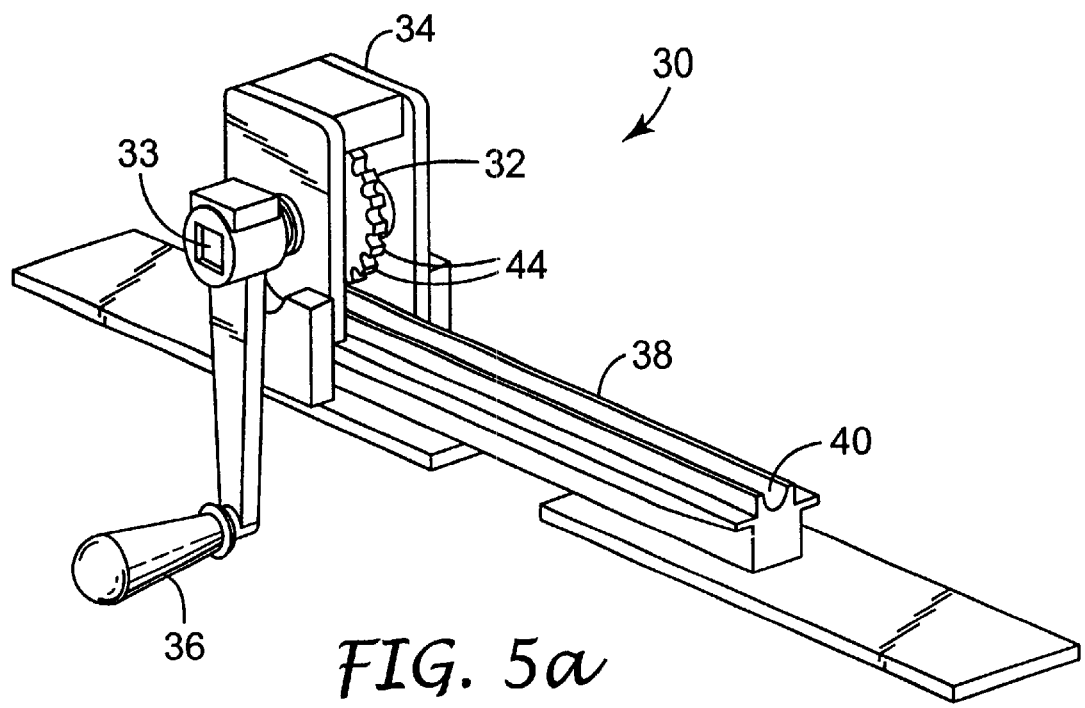
FIGS. 5a–5b illustrates a rotary embossing apparatus useful to manufacture light fibers of the present invention.

Yet another method for manufacturing light fiber of the present invention involves a rotary embossing method. Referring to FIG. 5a, a rotary embossing apparatus 30 suitable for manufacturing light fiber of the present invention is shown. Rotary embossing apparatus 30 includes embossing wheel 32 that is rotatably mounted on embossing wheel housing 34. Embossing wheel 32 includes embossing elements 44 that are regularly spaced around the circumference of the embossing wheel 32 and extend in a radial direction. Embossing wheel 32 may be a sprocket, for example, an ANSI 40 sprocket, ANSI 35 sprocket or ANSI 24 sprocket, or it may be a spur gear. Embossing wheel 32 is attached to handle 36 such that when handle 36 is rotated, for example, in a clockwise direction, embossing wheel 32 rotates in the same direction about its central axis 33. Embossing wheel housing 34 is slidably attached to track 38. Track 38 includes groove 40 for securely holding a clad light fiber (not shown) during a rotary embossing process. In the embodiment of FIG. 5, groove 40 is semicircular in shape for holding a light fiber having, for example, a circular cross-sectional shape. Other groove designs may be more desirable for embossing clad light fiber having a other cross sectional profiles.

Figure 5B:
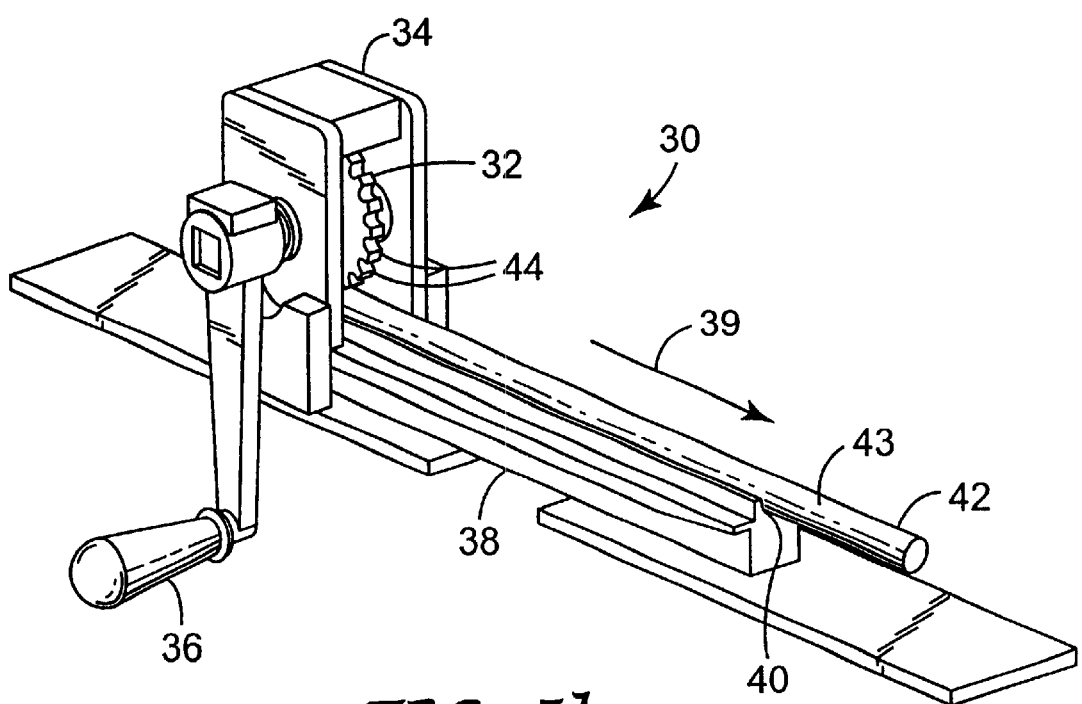
Figure 5C:
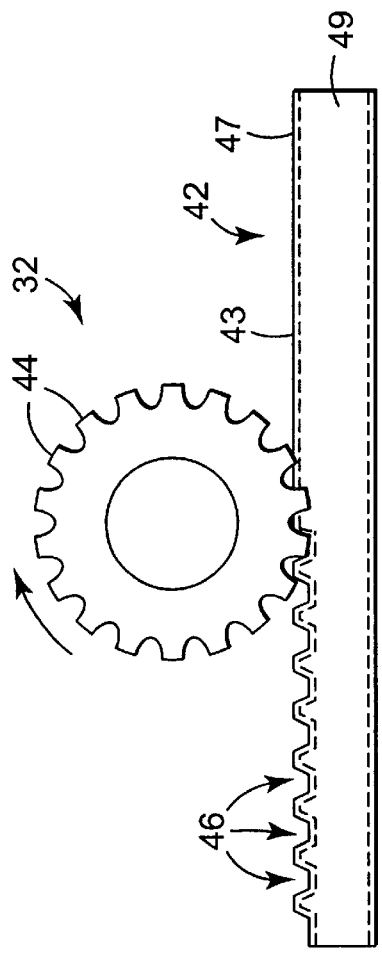
FIG. 5c is schematic illustration of a rotary embossing process.

In use of rotary embossing apparatus 30, a clad light fiber 42 (having core 49 and outer cladding layer 47) is placed in groove 40 of track 38 (see FIG. 5b). Handle 36 is rotated in a clockwise direction causing embossing elements 44 of embossing wheel 32 to press into embossing contact with the lateral surface 43 of clad light fiber 42. During operation of the rotary embossing apparatus 30, the embossing wheel 32 and embossing wheel housing 34 moves along track 38 (in the direction shown by arrow 39) following clad light fiber 42 and embossing the light fiber as it moves along the track 38. Referring now to FIG. 5c, a schematic illustration of the rotary embossing process is shown. As shown in FIG. 5c, the portion of the light fiber 42 that has been embossed contains a series of optical elements 46 spaced at a distance from one another along the light fiber 42. Optical elements 46 are formed without cutting or otherwise sacrificing the integrity of the outer cladding material 47 that surrounds the core 49 of the light fiber 42.

One of skill in the art will recognize that the rotary embossing apparatus 30 could be modified so that embossing wheel 32 is driven by mechanical means, for example, an electric motor connected through one or more gears to the embossing wheel 32.

Figure 6:
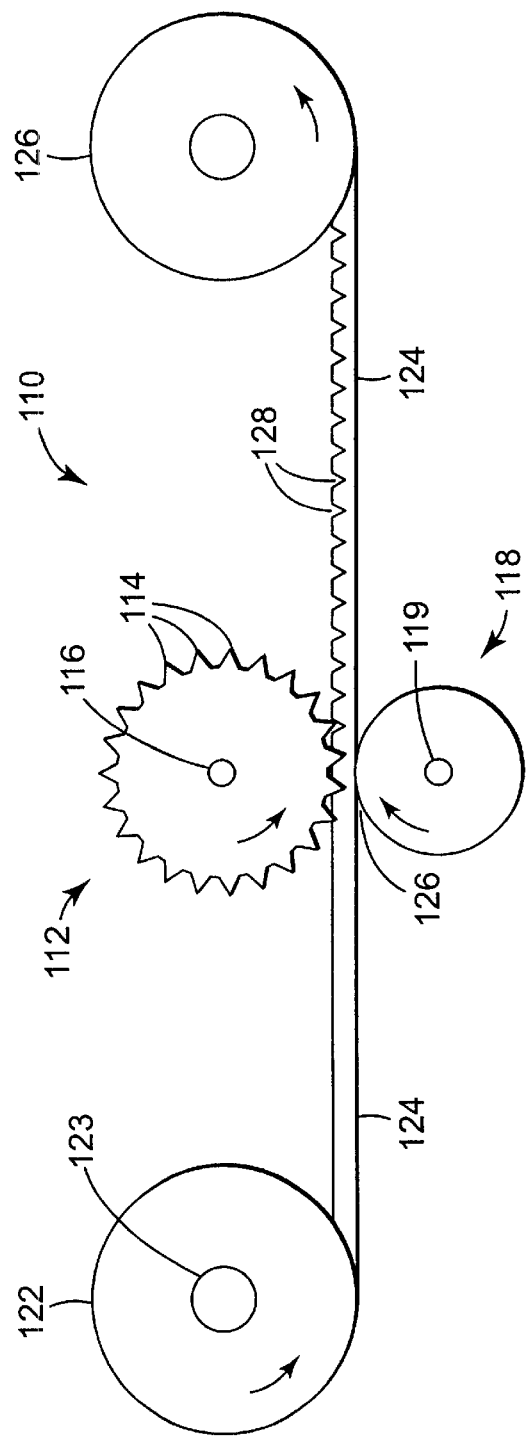
FIG. 6 illustrates a rotary embossing apparatus useful to manufacture light fibers of the present invention.

A schematic illustration of another embodiment of an embossing apparatus 110 suitable for manufacturing light fiber of the present invention is shown in FIG. 6. Embossing apparatus 110 includes embossing wheel 112 that is mounted so that it can rotate about its central axis 116. Embossing wheel 112 includes a plurality of embossing elements 114 spaced about the circumference of the wheel and extending in a radial direction. Optionally, embossing wheel 112 may include means for heating or cooling, for example, means for circulating steam and/or water of a desired temperature through a cavity (not shown) in the interior of the embossing wheel 112. Embossing apparatus 110 further includes nip roll 118 mounted so that it can rotate in a clockwise direction about its central axis 119. Clad light fiber to be embossed is supplied to the embossing wheel from supply roll 122 that contains a length of clad light fiber 124. Apparatus 110 further includes wind-up roll 126 for holding a length of clad light fiber after it has been embossed.

In operation of embossing apparatus 110, embossing wheel 112 is rotated (e.g., by an electric motor) in a counterclockwise direction causing clad light fiber 124 to be pulled from supply roll 122 (having axis of rotation 123) through nip 126 created between embossing wheel 112 and nip roll 118. As the clad light fiber 124 is pulled through nip 126 (i.e., the space between embossing wheel 112 and nip roll 118) it is embossed by embossing elements 114 creating a series of optical elements 128 spaced at a distance from one another along the length of the clad light fiber 124. Optical elements 128 are formed without cutting outer cladding material (not shown) that surrounds the clad light fiber 124. After embossing, the clad light fiber 124 is rolled onto wind-up roll 126.

The depth of the optical elements 128 embossed into the clad light fiber 124 can be controlled, for example, by opening or closing nip 126 between embossing wheel 112 and nip roll 118. For example, as nip 126 is made smaller, the depth of the optical elements 128 will tend to increase. It may be desirable in some instances to create a length of light fiber having a controlled variation in the depth of the optical elements along the length of the light fiber. This may be accomplished using embossing apparatus 110, for example, by varying the size of nip 126 in a controlled fashion during the embossing operation. For example, nip roll 118 could be made to have an elliptical shape so that the size of nip 126 would vary throughout rotation of the nip roll 118. Alternatively, control means could be employed to vary the size of nip 126 by moving one or both of nip roll 118 and embossing wheel 112 relative to the other. In this way, the depth of the optical elements on the light fiber can be controlled.

It is understood by those of skill in the art that the shape, size, orientation, and spacing of the embossing elements may be selected to provide the desired shape, size, orientation, and spacing of the optical elements along the light fiber. Generally speaking, the shape, size, orientation and spacing of embossing elements will typically not identically match the shape, size, orientation and spacing of the optical elements imparted to light fiber. Accordingly, it may be necessary to experiment with the shape, size, orientation and spacing of the embossing elements, along with the process conditions for embossing (e.g., temperature, pressure and contact time) in order to produce a light fiber having the desired optical characteristics. Furthermore, it may be necessary to experiment with the embossing process conditions (e.g., temperature, pressure and contact time) and the shape, size, orientation and spacing of the embossing elements in order to produce light fibers of the present invention having a continuous and uncut outer cladding material. Generally speaking, the temperature, embossing pressure, cladding thickness, shape of the embossing elements, cooling time, and composition of the light fiber cladding and core, among other factors that will be understood by one of skill in the art, may affect the final shape, size, orientation, and spacing of the optical elements embossed into the clad light fiber.

Figure 7:
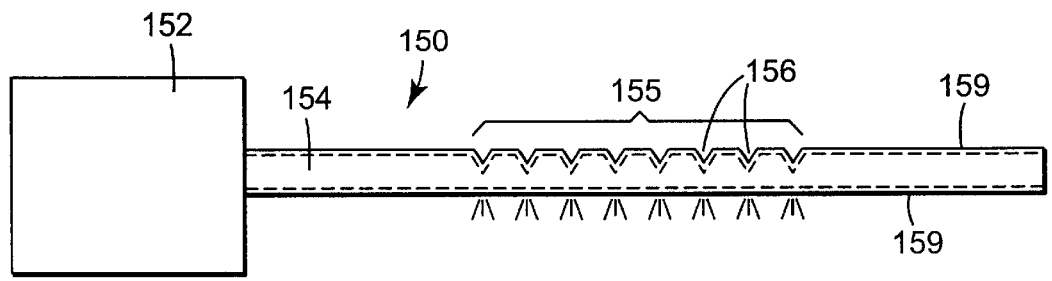
FIG. 7 is a side view of an embodiment of an illumination device of the present invention.

Light fibers of the present invention may be advantageously employed in illumination devices. FIG. 7 is a schematic depiction of an illumination device 150 in accordance with the present invention. Illumination device 150 includes a light source 152 optically coupled with a clad light fiber 154 of the present invention. The particulars of the light source are not critical to the present invention. For example, a particularly useful light source is a flashlight such as those available under the trade designation "STREAMLIGHT STINGER" (available from Streamlight, Inc., Eagleville, Pa.) or those available under the trade designation "MAGLITE" (available from Mag Instruments, Inc., Ontario, CA). Other suitable commercially available light sources include, for example, the light source available under the trade designation "LIGHT PUMP" (available from Remote Source Lighting International, Inc., CA) and the light source available under the trade designation "POWERHOUSE METAL HALIDE ILLUMINATOR" (commercially available from Lumenyte International Corp., CA). Clad light fiber 154 includes a light-emitting region 155 extending along a portion of its length. Light-emitting region 155 includes at least one, more preferably a series of spaced embossed optical elements 156. In accordance with the present invention, the clad light fiber 154 has a continuous outer cladding layer 159 that is continuous over the lateral surface of the light fiber including the optical elements 156 comprising the light-emitting region 155. In use, light from the light source 152 is directed into clad light fiber 154 such that the light propagates through the light fiber by total internal reflection. A portion of the light propagating through clad light fiber 154 becomes incident on the reflective surfaces of optical elements 156 and is reflected from the fiber through the light-emitting region 155.

Figure 8:
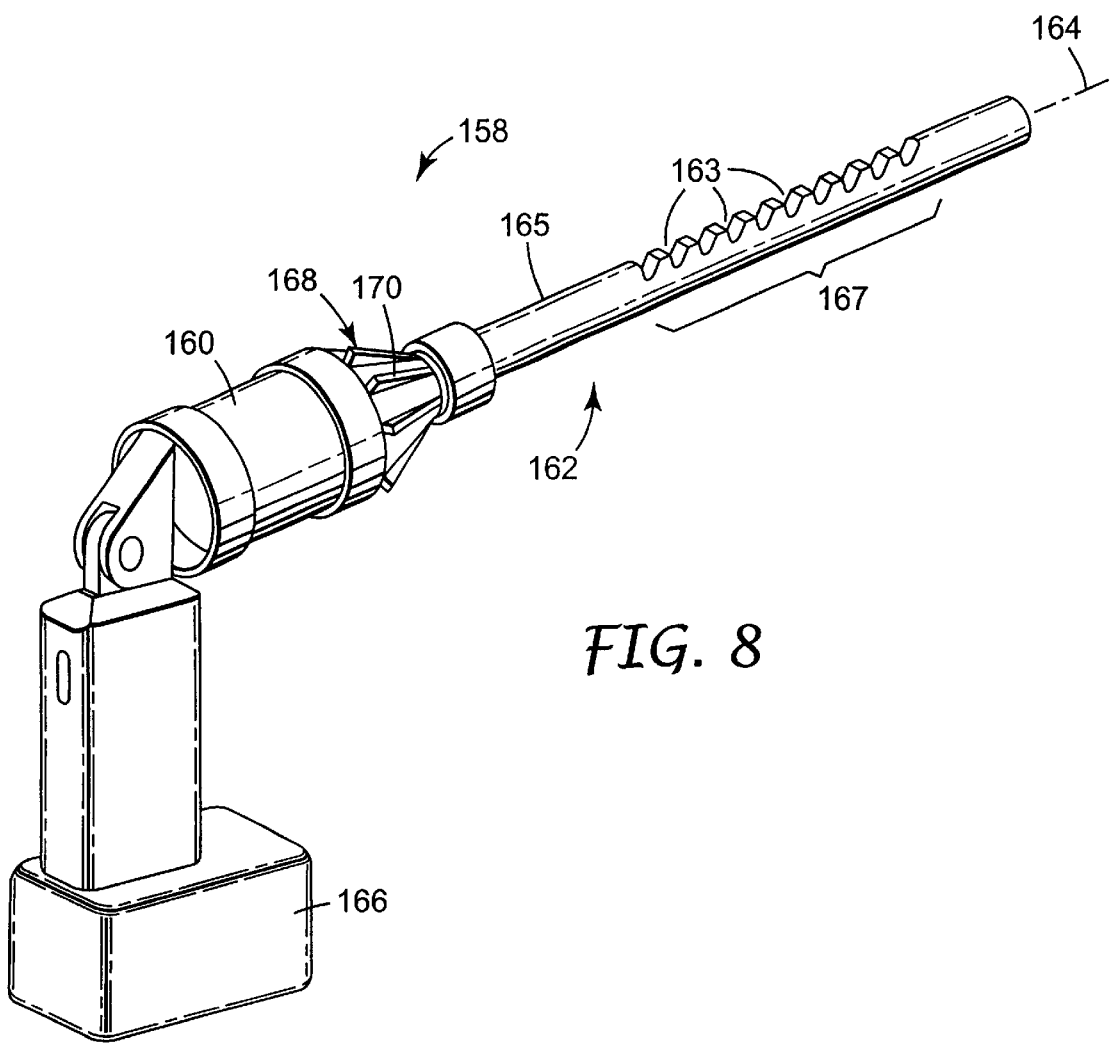
FIG. 8 is a perspective view of an embodiment of an illumination device of the present invention.

FIG. 8 is a perspective view of one illumination device 158 according to the present invention including a light source 160 optically coupled to a clad light fiber 162 of the present invention. The light fiber 162 is elongated along a longitudinal axis 164. The illumination device illustrated in FIG. 8 may be used to provide illumination for any desired purpose. For example, the illumination device may be used as a worklight.

The light source 160 may provide light by any suitable mechanism. For example, light source 160 may be incandescent, fluorescent, an array of light-emitting diodes, high intensity discharge (HID) lamp, or any other suitable source producing light having the desired wavelength or range of wavelengths. Typically, the preferred light source will emit light energy in the visible wavelength spectrum or at least a portion of the visible wavelength spectrum. Although the light source 160 illustrated in FIG. 8 is powered by a battery 166 it will be understood that the energy used to power the light source 160 could alternatively be alternating current, direct current, etc.

Where the light source 160 is larger than the cross-sectional diameter of the clad light fiber 162, it may also be desirable to include a coupling 168 to transition from the larger cross-sectional size of the light source 160 down to the smaller cross-sectional size of the clad light fiber 162. The coupling 168 may preferably be lined with a highly reflective material, such as a metal coating, to efficiently direct light to the clad light fiber 162. One alternative to a metal coating for the interior of the coupling 168 is a reflective material such as the reflective multi-layer optical films reported in, for example, PCT Publication Nos. WO 95/17303; WO 95/17691; WO 95/17692; WO 95/17699; and WO 96/19347. Examples of reflective multi-layer optical films such as those reported in the above PCT Publications are available from Minnesota Mining and Manufacturing Co., St. Paul, Minn. Such reflective films may be particularly desirable for their abilities to reflect light build-up in the coupling 168.

The light source 160 may include a fan or other cooling device to remove thermal energy generated by the light source during operation. In addition, the coupling may include cooling fins 170 to dissipate thermal energy from the coupling.

Clad light fiber 162 is more closely detailed in FIG. 1 and includes at least one, more preferably a series of embossed optical elements 163 spaced along at least a portion of the length of the fiber and defining the light emitting region 167. Clad light fiber 162 further includes an outer cladding layer 165 that is continuous over the lateral surface the light fiber core and the optical elements 163 (see, also FIG. 1).

Clad light fiber 162 may be rotatably or non-rotatably attached to the light source 160. In one embodiment, the clad light fiber 162 is attached to the light source in a manner that allows for rotation of the light fiber along its longitudinal axis 164. The rotation of clad light fiber 162 about its longitudinal axis also preferably rotates the light-emitting region 167. One advantage provided by rotation of the clad light fiber 160 about longitudinal axis 164 relative to the light source 160 is that the direction of the light exiting from the light-emitting region 167 can be varied to provide illumination in a desired direction depending on the needs of the user.

Where a coupling 168 is used to connect the light source 160 and clad light fiber 162, the coupling 168 may be fixed to the clad light fiber 162, in which case the clad light fiber 162 and coupling 168 may both rotate relative to the light source 160. Alternatively, the coupling 160 may be fixed to the light source, in which case the clad light fiber 162 may rotate relative to the coupling and light source 160. Alternatively, the clad light fiber 162 and coupling 168, if present, may be non-rotatably attached to the light source 160.

Figure 9A:
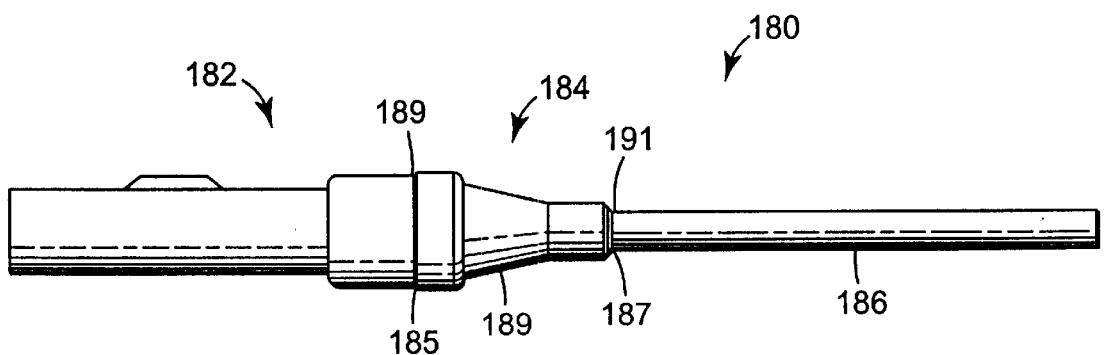
FIG. 9a is a side view of an embodiment of an illumination device of the present invention.
Figure 9B:
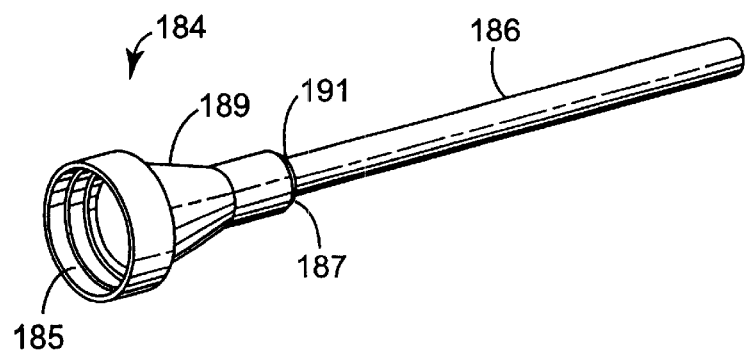

Referring now to FIGS. 9a an illumination device of the present invention is shown. Illumination device 180 includes light source 182, which in the embodiment of FIG. 9a is a standard flashlight. Illumination device 180 further includes optical coupling 184 which is friction-fit over the light emitting end 189 of light source 182. Optical coupling 184 includes input end 185 and output end 187 and conical light-directing region 189 extending between the input end 185 and the output end 187 of the optical coupling 184. The output end 187 holds a clad light fiber 186 of the present invention. Input end 185 of optical coupling 184 is circular and is sized to detachably hold the light-emitting end 189 of light source 182, for example, via friction fit. A perspective view of the optical coupling 184 and clad light fiber 186 having been detached from light source 182 is shown in FIG. 9b. Optical coupling 184 functions to optically couple the light source 182 with the clad light fiber 186 so that light emitted from the light source 182 is directed by the conical light-directing region 189 to the input end 191 of the clad light fiber 186. The interior of the coupling 184 is preferably lined with a highly reflective material, such as those previously described for the embodiment of FIG. 8, to efficiently direct light from the light source 182 to the clad light fiber 186.

EXAMPLES

These examples are merely for illustrative purposes and are not meant to be limiting on the scope of the appended claims.

General Experimental

All light fibers used for these experiments are commercially available from the Minnesota Mining and Manufacturing Company, St. Paul, Minn.; Lumenyte International, Costa Mesa, Calif.; or Poly Optics, Australia. Except where noted, light fibers had a circular cross-sectional shape and were nominally 10 mm in outside diameter.

Example 1

This example demonstrates a batch embossing of a solid core light fiber (commercially available under the trade designation "POLY 100" from Poly Optics, Australia). The core of the light fiber comprised a pure cast acrylic monomer including methyl methacrylate. The outer cladding layer comprised polytetrafluoroethylene (i.e., Teflon). The overall diameter of the light fiber was about 10 mm +/−0.5 mm and the outer cladding had a thickness of about 0.2 mm±0.05 mm.

A device was fabricated to emboss a series of optical elements in the sidewall of the light fiber. The embossing element had an overall length of 140 mm and consisted of repeating substantially triangular shaped raised ridges spaced every 6.35 mm along the embossing element and having a height of 3.0 mm. Each element had a vertex angle of 60°. The tip of each raised ridge was truncated to create a 1 mm flat portion at the tip of the ridge.

A two-piece clamping fixture was created to hold the embossing device. The two sides of the fixture were aligned with respect to one another by a series of guide pins. Pressure was applied to the fixture by a hydraulic press ("PHI" press available from Pasadena Hydraulics WG from Elmonte, Calif.). The pressure was measured at about 2812 kg/cm². The embossing time was 5 seconds.

After the fiber was removed from the fixture, there was some recovery of the embossed optical elements of the fiber. This relaxation process after the thermo mechanical processing of the fiber limited how much light extraction was achieved during the typical embossing process. The embossing depth of the optical elements was 0.2 mm.

A flashlight (commercially available as "STREAM-LIGHT STINGER" flashlight from Tactical Flashlight Shop of Wichita, Kans. 67212) was introduced at one end of the light fiber and sidelight (i.e., light emitted from the side surface of the light fiber) was visually observed.

The embossed samples prepared as described above that appeared to have an intact cladding by the naked eye were further examined with a Leica brand optical stereomicroscope capable of a maximum magnification of 512×. The samples were examined under dark field, light field, and by illuminating the fiber with a light source. If no defects in the cladding could be found at the maximum magnification, the cladding was deemed intact and the experiment was successful in producing the desire article.

Example 2

This example demonstrates the effect of temperature on the embossing process. For all trials in this example the embossing element had an overall length of 140 mm and was made up of triangular shaped raised ridges with a tip-to-tip spacing of 6.35 mm and a depth of 4.0 mm. The vertex angle of the raised ridges was 60°. A metal 5 inch (12.7 cm) C-clamp was used to apply pressure to the embossing element. To provide additional torque, the tightening lever of the C-clamp was extended using an 11.5 inch (29.2 cm) extension bar. The C-clamp was manually tightened using the extension bar. The embossing time was measured while the C-clamp was fully tightened. The embossed light fiber samples that appeared to have an intact cladding by unaided visual inspection were further examined with a Leica brand optical stereomicroscope capable of a maximum magnification of 512×. The samples were examined under dark field, light field, and by illuminating the fiber with a light source. If no defects in the cladding were found at the maximum magnification, the cladding was deemed intact. The results of this example are reported in Table 1 below.

TABLE 1

| Temperature (° C.) | Embossing Time (seconds) | Optical Elements (mm) | Cladding State |
|---|---|---|---|
| 79 | 60 | 0.2 | Cladding intact |
| 104 | 60 | 0.2 | Cladding cut |
| 121 | 60 | 0.2 | Cladding cut |
| 149 | 60 | 0.2 | Cladding cut; |

TABLE 1-continued

| Temperature (° C.) | Embossing Time (seconds) | Optical Elements (mm) | Cladding State |
|---|---|---|---|
| 149 | 10 | 0.2 | Cladding melted with bubbles Cladding cut; Cladding melted with bubbles |

Example 3

This example demonstrates a rotary embossing technique for manufacturing light fibers of the present invention including evaluation of several embossing wheel shapes and rotary embossing pressure measurements. A device was constructed substantially as shown in FIG. 5a. A series of ANSI sprockets were evaluated as the embossing wheel. It was generally observed that ANSI 35 (0.95 cm spacing between embossing elements) and ANSI 25 (0.635 cm spacing between embossing elements) sprockets had embossing elements that were too sharp and often penetrated or cut the cladding of the light fiber during rotary embossing. An ANSI 40 sprocket having embossing elements spaced at 1.27 cm was then evaluated and was found to have embossing elements satisfactory for manufacturing light fiber of the present invention having a continuous outer cladding.

Next, a 16 pitch, 7.62-cm diameter spur gear (commercially available Boston Gear, part number NB48) was evaluated as the embossing wheel. In its unmodified form, the embossing elements (i.e., teeth) of the spur gear had a top face that measured 2 mm in the radial direction (i.e., along the circumference) of the gear and 1.27 cm in the longitudinal direction (i.e., thickness of the gear). Due to the viscoelastic nature of the light fiber core, the dimensions of the teeth were not exactly reproduced during embossing. The teeth of the spur gear were modified so that the 2-mm face was reduced to 0.5 mm. This modified spur gear was used in a rotary embossing process and was found to cut the cladding of the clad light fiber at room temperature. At elevated temperatures, it was found that the modified spur gear could successfully be used to emboss a clad light fiber without cutting the cladding.

A second 16 pitch, 7.62 cm diameter spur gear (commercially available Boston Gear, part number NB48) was modified to have a 1 mm face in the radial direction. This modified spur gear was used in a rotary embossing process at room temperature and was found to perform well as an embossing wheel for the manufacture of light fiber of the present invention.

To measure the pressure applied by the embossing elements (i.e., teeth) to the clad light fiber during a rotary embossing process a pressure-indicating film was used (pressure indicating film was commercially available from Sensor Products, Inc, East Hanover, N.J.). For this example, the high range pressure-indicating film (measures pressures ranging from about 499 to about 1300 kg/cm²) was used. The pressure indicating film was inserted between the clad light fiber and the embossing elements of the embossing wheel (NB 48 spur gear modified to have 1 mm face in radial direction). After exposure to the pressure of embossing, the pressure indicating film was read following the directions provided by the manufacturer. According to the specifications of the pressure-indicating film all results have an error of ±15% of the measured value. The pressure values measured during rotary embossing of light fiber of the present invention were as follows.

| Embossed Optical Element Depth (mm) | Embossing Pressure (kg/cm$^2$) |
|---|---|
| 0.1 | 597.6 |
| 0.3 | 808.5 |

Example 4

To quantify the sidelight extraction rate, measurement of end light brightness were performed using a Light Gauge brand photometer (available from Coherent Auburn Group). The photometer had been recently calibrated by International Light, Newburyport, Mass. All light fiber samples were made using an unmodified spur gear operated at room temperature (see, Example 4). The light fiber samples were cut to a length of 188 mm. The diameter of the light fiber ranged from 9.0 to 9.1 mm. A cone-shaped adapter was fitted with reflective film (VM 2000, from 3M Company, Saint Paul, Minn.). Electrical tape was used to block stray light emission from the cone-shaped adapter. A fully charged flashlight (commercially available under the trade designation "STREAMLIGHT STINGER" flashlight) was used as the illumination source. The light fiber samples were positioned to minimize effects of insertion depth and alignment. The fiber ends were cut perpendicular to length of the fiber and parallel to each other. The light meter was positioned at the end of the fiber at the position of maximum output to measure end light transmitted out the end of the fiber. Using an unmodified piece of fiber as a control, the amount of light extracted out the side can be calculated by difference. Table 2 provides data illustrating the effect of embossing depth on light extraction.

TABLE 2

| Embossed Depth (mm) | End Light (lumens) | Percent of Light Extracted (%) |
|---|---|---|
| Control (none) | 10.3 | 0 |
| 0.4 | 7.8 | 24.2 |
| 0.5 | 6.1 | 40.8 |

Example 5

Embossed fibers of the present invention were prepared using a rotary embossing device substantially as shown in FIG. 5a. The embossing wheel used was an unmodified spur gear (commercially available Boston Gear, part number NB48). To prevent cutting of the light fiber cladding, some fibers were heated prior to embossing. Heating was accomplished using an infrared heat lamp (commercially available under the trade designation "2000-WATT SPEED RAY" from Infratech Corp. Corvina, Calif.). For comparison, clad light fiber samples in a notched (Comp. Ex. A) and un-notched (Comp. Ex. B) configurations were obtained from Poly Optics, AU. Comparative Example A had notches cut along the length of the light fiber that were spaced 6.35 mm±1.27 mm from one another. The notches had a depth of 1.015 mm±0.25 mm and were angled relative to the longitudinal axis of the light fiber at an angle of 35°±5°.

Prior to testing, all light fiber samples were cut to a length of 124 mm. The cladding state was determined using the microscope technique reported in Example 1. The amount of endlight emitted from the various light fiber samples was measured for each light fiber sample using the technique reported in Example 4 except that the length of each fiber was 124 mm.

The results are reported in Table 3 below.

TABLE 3

| Fiber | Fiber Diameter (mm) | Depth of Optical Elements (mm) | Gear Face (mm) | Cladding | Embossing Temperature (° C.) | Endlight (lumens) | Light Extracted (%) |
|---|---|---|---|---|---|---|---|
| No Notch | 9.2 | N/A | N/A | Intact | N/A | 11.4 | N/A |
| 0.635 mm | 9.4 | 1.0 | N/A | Cut | N/A | 10.5 | 7.9 |
| A | 9.2 | 0.2 | 0.5 | Cut | 22 | 5.3 | 53.5 |
| B | 9.0 | 0.2–0.3 | 0.5 | Intact | 100 | 6.3 | 44.7 |
| C | 9.4 | 0.3 | 0.5 | Intact | 107 | 6.4 | 43.9 |
| D | 9.3 | 0.5 | 0.5 | Intact | 110 | 5.6 | 50.9 |
| E | 9.0 | 0.2 | 1.0 | Intact | 22 | 5.3 | 53.5 |

Example 6

This example demonstrates the increased mechanical robustness of an embossed fiber as compared to a notched fiber.

Nominal 10 mm fiber was purchased from Poly Optics, Australia in the standard (no notches) and Poly Bright (notched) configurations (see, Example 5).

The nominal 10 mm fiber was embossed using the spur gear that had been radiused to present a 1 mm face to the fiber (see, Example 3). The average depth of the embossed optical elements was 0.25 mm. The notched and embossed light fiber samples were each cut to a length of 15 mm in preparation for durability testing.

The durability of the light fibers was tested as follows. Holding the fiber by the two ends, the ends of the fiber were bought together by bending the fiber into "U" shape and then touching the ends together with the notches or embossed elements located on the interior of the "U". The fiber was then bent 180 degrees in the other direction, again touching the ends together so that the notches or embossed optical elements were now on the outside of the "U". The fiber was again bent 180 degrees thus returning it to the starting configuration having notches or embossed optical elements on the interior of the "U". This operation represented one bending cycle. The time to complete one bending cycle (the period) was 4 seconds. A metronome set to 60 bpm with a measure counting bell set to 4 beats per measure was used to time the bending cycles. The notches or embossed elements were continually inspected during the testing, with the number of cycles to cladding tear and light fiber breakage being recorded.

Inspection of the light fibers was performed using a Leica brand optical stereomicroscope capable of a maximum magnification of 512x. The samples were examined under dark field, light field, and by illuminating the fiber with a light source. If no defects in the cladding were found at the maximum magnification, the cladding was deemed intact. The results of this example are reported in Table 4 below. The numbers shown are the number of cycles until specified failure. Failures were defined as cladding tear and fiber breaks.

TABLE 4

| Type of Fiber | Notched Fiber | | Embossed Fiber | |
|---|---|---|---|---|
| Trial Number | Cladding tear | Fiber Break | Cladding Tear | Fiber Break |
| 1 | 8 | 24 | 40 | 71 |
| 2 | 7 | 21 | 59 | 68 |
| 3 | 4 | 19 | 61 | 67 |
| Average | 6.3 | 21.3 | 53.3 | 68.7 |

Example 7

This Example demonstrates the permanence of the embossed optical elements when exposed to high temperatures. A 10 mm fiber was embossed as in Example 5 using an unmodified spur gear. The average depth of the optical elements embossed in the light fiber was 0.65 mm. The embossed light fiber was then heat aged in an oven at 79° C. for 7 days. After heat aging, the optical elements were again measured and were found to have an average depth of 0.60 mm.

Example 8

This example demonstrates that an embossing process may be used with a PVC jacketed fiber. Nominal 10 mm PVC jacketed fiber (commercially available from Lumenyte International Corporation) was embossed using the spur gear that had been radiused to present a 1 mm face to the fiber (see, Example 4). The average depth of the optical elements in the fiber was 0.9 mm. By inspection with an optical microscope, it was observed that the cladding and PVC jacket were intact after embossing.

The complete disclosures of the patents, patent documents, and publications cited herein are incorporated by reference in their entirety as if each were individually incorporated. Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

What is claimed is:

1. A light fiber comprising:
   (a) an elongate polymeric core having an input end for receiving light from a light source, an output end for emitting light transmitted through the core, and a lateral surface extending along a longitudinal axis of the core between the input end and the output end;
   (b) a light-emitting region directing light traveling though the light fiber out of at least a portion of the lateral surface of the light fiber in a direction generally transverse to the longitudinal axis, the light-emitting region comprising at least one optical element; and
   (c) a continuous outer cladding layer comprising a polymeric material having a lower index of refraction than the core extending over the lateral surface of the core and the optical elements.

2. The light fiber of claim 1, wherein the light-emitting region comprises a series of two or more optical elements separated at a distance from one another along the longitudinal axis of the core.

3. The light fiber of claim 2, wherein the core comprises a polymer selected from the group consisting of poly(alkyl acrylates) and poly(alkyl methacrylates).

4. The light fiber of claim 2, wherein the continuous outer cladding comprises fluorinated ethylene-propylene.

5. The light fiber of claim 2, wherein the light-emitting region comprises at least three optical elements regularly spaced along the longitudinal axis of the core.

6. The light fiber of claim 2, wherein the light-emitting region comprises at least three optical elements irregularly spaced along the longitudinal axis of the core.

7. The light fiber of claim 2, wherein the light fiber has a cross-sectional shape selected from the group of shapes consisting of a circle, ellipse, triangle and square.

8. The light fiber of claim 2, wherein the optical elements have a depth ranging from about 1% to 10% of a thickness of the light fiber.

9. The light fiber of claim 2, wherein the light fiber includes a first optical element having a first depth and a second optical element having a second depth wherein the first depth is not equal to the second depth.

10. The light fiber of claim 2, wherein the light fiber has a circular cross-sectional shape and has a diameter ranging from about 1 mm to about 25 mm.

11. The light fiber of claim 2, wherein the outer cladding layer has a thickness less than about 1 mm.

12. The light fiber of claim 2 further including a jacket layer over the outer cladding layer.

13. The light fiber of claim 2, wherein the light-emitting region has a lateral angular distribution of 360° or less.

14. The light fiber of claim 2, wherein each of the optical elements comprise at least one reflection surface inclined at an angle from 10° to 80° to a plane normal to the longitudinal axis of the core.

15. The light fiber of claim 14, wherein the light emitting region has a length along the longitudinal axis that is less than the total length of the light fiber along the longitudinal axis.

16. A method of making a light fiber having a light-emitting region comprising at least one optical element comprising the steps of:
   (a) providing a light fiber comprising an elongate polymeric core having an input end for receiving light from a light source, an output end for emitting light transmitted through the core, and a lateral surface extending along a longitudinal axis of the core between the input end and the output end;
   (b) providing an embossing tool having at least one embossing element; and
   (c) embossing the light fiber by bringing into contact at least one embossing element of the embossing tool with the lateral surface of the light fiber and apply pressure such that the embossing element indents the central core of the light fiber thereby creating an optical element;
   wherein after the embossing step the cladding layer remains as a continuous layer extending over the lateral surface of the core and the optical element.

17. The method of claim 16, wherein the embossing tool is in the form of a wheel having a central axis and a series of embossing elements spaced over the circumference of the wheel and extending in a radial direction and wherein the embossing step includes the step of rotating the embossing tool about its central axis.

18. The method of claim 16, wherein at least one embossing element comprises a first side surface and a second side surface which meet at a vertex having an angle ranging from about 20° to about 150°.

19. The method of claim 18, wherein the vertex of the embossing element is truncated.

20. The method of claim 16, wherein the vertex of the embossing element is radiused.

21. The method of claim 16, wherein the embossing tool is heated.

* * * * *

UNITED STATES PATENT AND TRADEMARK OFFICE
CERTIFICATE OF CORRECTION

PATENT NO.     : 6,535,667 B1
DATED          : March 18, 2003
INVENTOR(S)    : Gozum, John E.

It is certified that error appears in the above-identified patent and that said Letters Patent is hereby corrected as shown below:

Title page,
Item [57], ABSTRACT,
Line 3, delete "though" and insert in place thereof -- through --.
Line 7, insert -- of -- following "portion".

Column 1,
Line 18, delete "that" and insert in place thereof -- than --.

Column 2,
Line 7, delete "though" and insert in place thereof -- through --.
Line 8, insert -- of -- following "portion".
Line 59, insert -- of the -- following "one".

Column 3,
Line 8, delete "though" and insert in place thereof -- through --.
Line 9, insert -- of -- following "portion"

Column 4,
Line 30, delete "illustrates" and insert in place thereof -- illustrate --.
Line 32, insert -- a -- following "is".

Column 5,
Line 17, delete "preferabiy" and insert in place thereof -- preferably --.
Line 44, delete "is" following "fiber".
Line 44, delete "mean" and insert in place thereof -- meant --.
Line 51, delete "its" and insert in place thereof -- it --.
Line 52, delete "it" and insert in place thereof -- is --.

Column 6,
Line 44, insert -- an -- following "provides".

Column 8,
Line 45, insert -- of -- following "depth".

Column 9,
Line 10, delete "a" following "having".

Column 11,
Line 58, insert -- of -- following "surface".

UNITED STATES PATENT AND TRADEMARK OFFICE
CERTIFICATE OF CORRECTION

PATENT NO. : 6,535,667 B1
DATED : March 18, 2003
INVENTOR(S) : Gozum, John E.

It is certified that error appears in the above-identified patent and that said Letters Patent is hereby corrected as shown below:

Column 12,
Line 16, insert -- and 9b -- following "9a".

Column 13,
Line 34, delete "desire" and insert in place thereof -- desired --.
Table 1, line 60, insert -- Depth of" before "Optical".

Column 14,
Under Table 1-continued, insert -- Depth of -- before "Optical".

Column 15,
Line 15, delete "measurement" and insert in place thereof -- measurements --.

Column 16,
Line 42, delete "bought" and insert in place thereof -- brought --.

Signed and Sealed this

Twentieth Day of April, 2004

JON W. DUDAS
*Acting Director of the United States Patent and Trademark Office*